(12) United States Patent
Jones

(10) Patent No.: US 12,213,473 B2
(45) Date of Patent: Feb. 4, 2025

(54) ANIMAL KILL TRAP

(71) Applicant: REWILD Limited, Inglewood (NZ)

(72) Inventor: Nicholas Paul David Jones, Inglewood (NZ)

(73) Assignee: REWILD Limited, Inglewood (NZ)

( * ) Notice: Subject to any disclaimer, the term of this patent is extended or adjusted under 35 U.S.C. 154(b) by 0 days.

(21) Appl. No.: 18/577,977

(22) PCT Filed: Jul. 8, 2022

(86) PCT No.: PCT/NZ2022/050093
§ 371 (c)(1),
(2) Date: Jan. 9, 2024

(87) PCT Pub. No.: WO2023/282772
PCT Pub. Date: Jan. 12, 2023

(65) Prior Publication Data
US 2024/0260564 A1  Aug. 8, 2024

(30) Foreign Application Priority Data

Jul. 9, 2021 (NZ) ........................................ 778064

(51) Int. Cl.
*A01M 23/30* (2006.01)
*A01M 23/16* (2006.01)
*A01M 23/24* (2006.01)

(52) U.S. Cl.
CPC .......... *A01M 23/30* (2013.01); *A01M 23/245* (2013.01); *A01M 23/16* (2013.01)

(58) Field of Classification Search
CPC ...... A01M 23/30; A01M 23/32; A01M 23/24; A01M 23/26; A01M 23/265; A01M 23/16; A01M 23/22
(Continued)

(56) References Cited

U.S. PATENT DOCUMENTS 83,074 A * 10/1868 McClure ................ A01M 23/30
43/81
465,056 A * 12/1891 Edwards ................ A01M 23/24
43/86
(Continued)

FOREIGN PATENT DOCUMENTS

DE 202005009127 U1 * 1/2006 .......... A01M 23/245
GB 2088688 A * 6/1982 ............ A01M 23/30
(Continued)

OTHER PUBLICATIONS

International Search Report issued in PCT/NZ2022/050093 on Sep. 21, 2022 (5 pages).

*Primary Examiner* — Darren W Ark
(74) *Attorney, Agent, or Firm* — ARC IP Law, PC; Joseph J. Mayo

(57) ABSTRACT

Described herein is an animal kill trap. More specifically, an improved animal trap configured for trapping and humanely killing small mammalian predators. The trap comprises an integrated enclosure which utilises the lid for setting the trap mechanism, and additionally acts as a safety mechanism wherein when the lid is the open position, the trap is deactivated and thus avoiding any harm to the user. The trap comprises a tunnel architecture which is appealing to the predators, and additionally has a capture flag to indicate when a predator has been captured.

34 Claims, 5 Drawing Sheets

(58) Field of Classification Search
USPC ..... 43/81, 81.5, 82, 83, 83.5, 88, 92, 96, 97
See application file for complete search history.

(56) References Cited

U.S. PATENT DOCUMENTS

| | | | | |
|---|---|---|---|---|
| 872,041 A * | 11/1907 | Armstrong | ............ | A01M 23/24 43/86 |
| 1,040,478 A * | 10/1912 | Wilson | ................ | A01M 23/12 43/73 |
| 1,059,114 A * | 4/1913 | Burke | ................ | A01M 21/00 43/75 |
| 1,180,909 A * | 4/1916 | Cunningham | ........ | A01M 23/30 43/83.5 |
| 1,288,777 A * | 12/1918 | Werts et al. | .......... | A01M 21/00 43/75 |
| 1,399,965 A * | 12/1921 | Kent | ...................... | A01M 23/00 43/73 |
| 1,648,160 A * | 11/1927 | Boedecker | ............ | A01M 23/22 43/62 |
| 1,992,353 A * | 2/1935 | Cattanach | ............ | A01M 23/30 43/81 |
| 2,059,937 A * | 11/1936 | Ellis | ...................... | A01M 23/30 43/81 |
| 2,169,783 A * | 8/1939 | Allen | ...................... | A01M 23/00 43/75 |
| 2,258,549 A * | 10/1941 | Drake | .................... | A01M 23/30 43/83 |
| 2,263,560 A * | 11/1941 | Barrows | ................ | A01M 23/30 43/83.5 |
| 2,268,966 A * | 1/1942 | Shiraishi | ................ | A01M 23/02 43/73 |
| 2,416,481 A * | 2/1947 | Hollenbeck | ........... | A01M 23/30 43/81 |
| 2,492,957 A * | 1/1950 | Blair | ...................... | A01M 23/24 43/120 |
| 2,525,010 A * | 10/1950 | Allison | ................. | A01M 23/26 43/83.5 |
| 2,578,762 A * | 12/1951 | Torgeson | .............. | A01M 23/08 43/73 |
| 2,581,327 A * | 1/1952 | Knox | ..................... | A01M 23/24 43/82 |
| 2,684,553 A * | 7/1954 | Schroeder | ............ | A01M 23/18 43/61 |
| 2,702,443 A * | 2/1955 | Bruske | .................... | A01M 23/30 43/81 |
| 3,045,384 A * | 7/1962 | Gruschow | ............ | A01M 23/12 43/81.5 |
| 3,114,985 A * | 12/1963 | Killinger | ............. | A01M 23/16 43/83.5 |
| 3,530,613 A * | 9/1970 | Brubakken | ............ | A01M 23/24 43/85 |
| 3,992,803 A * | 11/1976 | Kaiser | ................... | A01M 23/30 43/83 |
| 4,216,606 A * | 8/1980 | Kaiser | ................... | A01M 23/30 43/83 |
| 4,341,033 A * | 7/1982 | Siegel | .................... | A01M 23/30 43/81 |
| 4,342,172 A * | 8/1982 | Guanci | ................. | A01M 23/18 43/61 |
| 4,424,640 A * | 1/1984 | Cook | ..................... | A01M 23/26 43/93 |
| 4,550,524 A * | 11/1985 | Goebel | ................. | A01M 23/02 43/75 |
| 4,607,450 A * | 8/1986 | Kaiser | ................... | A01M 23/30 43/83 |
| 4,669,216 A * | 6/1987 | Moss | ..................... | A01M 27/00 43/99 |
| 4,852,294 A * | 8/1989 | Langli | ................... | A01M 23/24 43/81 |
| 4,979,327 A * | 12/1990 | Harris | ................... | A01M 23/16 43/61 |
| 5,148,624 A * | 9/1992 | Schmidt | ................ | A01M 23/30 43/81 |
| 5,172,512 A * | 12/1992 | Bodker | ................. | A01M 23/30 43/81 |
| 5,267,411 A * | 12/1993 | Phillips | ................. | A01M 23/30 43/81 |
| 5,706,601 A * | 1/1998 | Dail | ....................... | A01M 23/30 43/81 |
| 6,199,314 B1 * | 3/2001 | Ballard | ................. | A01M 23/30 43/81 |
| 6,735,899 B1 * | 5/2004 | Anderson | ............. | A01M 23/04 43/98 |
| 7,026,942 B2 * | 4/2006 | Cristofori | ............. | A01M 23/08 340/573.2 |
| 8,104,222 B2 * | 1/2012 | Hovey | .................. | A01M 23/30 43/81 |
| 8,695,274 B2 * | 4/2014 | Gauker | ................. | A01M 25/00 43/67 |
| 8,943,741 B2 * | 2/2015 | Watson | ................. | A01M 23/30 43/88 |
| 10,477,854 B1 * | 11/2019 | Yang | ..................... | A01M 23/245 |
| 10,512,259 B2 * | 12/2019 | Walsh | .................. | A01M 23/36 |
| 11,252,952 B2 * | 2/2022 | Walsh | .................. | A01M 23/265 |
| 11,800,863 B2 * | 10/2023 | Vickery | ................ | A01M 23/30 |
| 2003/0172580 A1 * | 9/2003 | Welin-Berger | ........ | A01M 23/24 43/87 |
| 2008/0178517 A1 * | 7/2008 | Han | ....................... | A01M 23/18 43/88 |
| 2008/0216386 A1 * | 9/2008 | Le Laidier | ............ | A01M 23/20 43/67 |
| 2008/0236024 A1 * | 10/2008 | Ouellette | .............. | A01M 23/30 43/81 |
| 2009/0193707 A1 * | 8/2009 | Moran | ................... | A01M 23/00 340/870.07 |
| 2011/0023350 A1 | 2/2011 | Hovey | | |
| 2014/0020278 A1 * | 1/2014 | Smith | ................... | A01M 23/24 43/79 |
| 2014/0230312 A1 * | 8/2014 | Le Laidier | ............ | A01M 23/30 43/77 |
| 2017/0156308 A1 * | 6/2017 | Frisch | ................... | A01M 23/22 |
| 2017/0281822 A1 * | 10/2017 | Becker | .................. | B05B 12/08 |
| 2018/0084772 A1 * | 3/2018 | Peeters | ................. | A01M 1/026 |
| 2018/0110214 A1 * | 4/2018 | McGrade | ............. | A01M 23/24 |
| 2018/0146657 A1 * | 5/2018 | Reilly | ................... | A01M 23/24 |
| 2018/0271085 A1 * | 9/2018 | Sørensen | ............... | A01M 23/38 |
| 2019/0037829 A1 * | 2/2019 | Laut | ....................... | G01R 33/07 |
| 2020/0178514 A1 * | 6/2020 | Schurman | ............. | A01M 23/30 |
| 2020/0267515 A1 * | 8/2020 | Stapleford | .............. | H04W 4/14 |
| 2020/0390082 A1 * | 12/2020 | Waiker | ................. | F16M 13/027 |
| 2021/0076663 A1 * | 3/2021 | Chisholm | ............. | A01M 23/30 |
| 2021/0378225 A1 * | 12/2021 | Göke | .................... | A01M 1/026 |
| 2022/0104475 A1 * | 4/2022 | Siri | ........................ | A01M 23/18 |
| 2022/0151219 A1 * | 5/2022 | Yang | .................... | A01M 23/265 |
| 2022/0295778 A1 * | 9/2022 | Holst-Pedersen | ..... | A01M 23/30 |
| 2022/0330539 A1 * | 10/2022 | Hansen | ................ | A01M 23/245 |
| 2023/0042831 A1 * | 2/2023 | Shah | .................... | A01M 23/08 |
| 2023/0116447 A1 * | 4/2023 | Yang | ..................... | A01M 23/30 43/81 |
| 2023/0389536 A1 * | 12/2023 | Schneider | ........... | A01M 23/245 |

FOREIGN PATENT DOCUMENTS

| | | | | |
|---|---|---|---|---|
| GB | 2587451 A * | 3/2021 | ............ | A01M 23/30 |
| WO | WO-9700607 A1 * | 1/1997 | ............ | A01M 23/24 |
| WO | WO-2004030451 A2 * | 4/2004 | ............ | A01M 23/18 |
| WO | WO-2007028416 A1 * | 3/2007 | ............ | A01M 23/20 |
| WO | WO-2013029689 A1 * | 3/2013 | ............ | A01M 23/30 |
| WO | WO-2013156395 A1 * | 10/2013 | ............ | A01M 23/30 |
| WO | WO-2020095032 A1 * | 5/2020 | ............ | A01M 23/00 |

* cited by examiner

ANIMAL KILL TRAP

RELATED APPLICATIONS

This application derives priority from New Zealand patent application number 770064 incorporated herein by reference.

TECHNICAL FIELD

Described herein is an animal kill trap. More specifically, an improved animal trap configured for trapping and humanely killing small mammalian predators. The trap comprises an integrated enclosure which utilises the lid for setting the trap mechanism, and additionally acts as a safety mechanism wherein when the lid is the open position, the trap is deactivated and thus avoiding any harm to the user. The trap comprises a tunnel architecture which is appealing to the predators, and additionally has a capture flag to indicate when a predator has been captured.

BACKGROUND ART

There are many animal kill traps known in the art for controlling predators and pests such as possums, stoats, ferrets and the like.

For example, U.S. 83074 discloses a trap comprising a bait-rod, which is pivoted to a support attached to a base mounted directly beneath a roller. To the end of the forward or long part of the rod is attached the bait, and upon the end of the rear or short part of the rod is formed a hook or catch, upon which the end of the long arm of the trip-lever allows setting the trap. As the animal enters the trap, and touches the bait, it springs the trap and catches and kills itself.

U.S. Pat. No. 1,059,114 discloses an animal trap wherein provision is made for automatically resetting the trap for a predetermined number of times, and wherein an operating spring is adapted to be wound up and is capable of being automatically reset after each tripping operation. The trap comprises a base, carrying wheels at one end of said base, a striker movable upon said base, a spring arranged to operate said striker, means whereby the striker is returned to its operative position after each stroke, and means whereby the carrying wheels are actuated by the return movement of the striker to move the trap a predetermined distance after each action of the striker.

U.S. Pat. No. 1,992,353 invention discloses a trap for vermin such as, rats, mice, stoats, weasels and the like. The apparatus comprises an enclosing box or casing the floor of which is furnished with an opening through which the head alone or the head and neck of the vermin can enter to have access to the bait and the floor is raised above the ground level to permit of this access to the opening within the box. Above the opening in the floor thereof is a trapping or killing device comprising conveniently a bait-carrying trigger which, when touched by the animal, releases a striker which then sweeps or passes over the opening and strikes the head or neck of the vermin, traps and kills it.

U.S. Pat. No. 2,169,783 discloses a rodent trap including a deadfall, a treadle, and means to automatically operate said deadfall repeatedly under control of said treadle, and including a reactive motor, a crank shaft beneath said deadfall and operative by said motor, a cam fast on said shaft for engagement with the underside of said deadfall and operative as an incident to single revolution cycles of operation thereof to elevate and release said deadfall, and cooperating trip devices on said shaft and treadle, respectively, for blocking operation of said shaft and cam at the end of each cycle of operation thereof.

U.S. Pat. No. 2,525,010 discloses an animal trap which includes a housing of semi-circular outline having a peripheral slot therein and an entrance opening formed at one end of said slot, a striker frame pivoted on an axis across the center of said housing between opposite walls thereof, a striker head on said frame, a portion of said frame extending through said slot to, permit manual movement of the frame, a spring connected at one of its ends to said frame and anchored at its other end so as to lie to one side of the pivot axis of the frame when the frame is in a set position at the end of the slot opposite the entrance opening, a lever having an end adjacent the entrance opening, and a bait platform disposed on one end of said lever adjacent the entrance opening, the other end of said lever being disposed to engage the frame when the animal moves the platform to thereby move the same to shift the line of force of the spring on the frame to the other side of the pivot axis thereof.

U.S. Pat. No. 3,114,985 discloses an animal trap comprising a lever for setting the trap from outside the frame without touching the animal engaging portions of the trap. When the trap is set, a sensitive trigger mechanism holds a latch which in turn holds a spring pressed bail in the cocked position. In particular, an animal trap having a U-shaped rigid sheet metal frame having a bottom base, opposed upstanding relatively high front and rear walls at opposite edges of the base, said front wall having a large opening at its lower extremity and spaced above said base, and opposed relatively low side flanges connecting said walls at opposite side edges of the base and cooperating with said walls for effectively excluding foreign matter from within said frame; a bail pivoted at the juncture of said base and rear wall for swinging movement within said frame between an upright position along said rear wall and a trapping position along said base; spring means urging said bail toward trapping position; an upstanding latch member pivoted near the top of said rear wall, said latch member having an upwardly opening slot inwardly of said pivot for receiving and releasably retaining said bail in upright position; means including a cam portion on said latch member terminating at said slot and cooperating with said bail upon movement of the bail toward upright position for pivoting said latch member to receive said bail in said slot; means including another cam portion on said latch member defining an edge along said slot and cooperating with said bail as said bail is received in said slot to pivot said latch member for releasably holding said bail in said slot; a trigger having a pressure pad overlying said base and freely pivoted at the juncture of said base and rear wall for pivotal movement of said pad toward and away from said base; cooperating latch means on a lower portion of said latch member and on said trigger and when engaged releasably holding said latch member in bail retaining position; and means including an additional cam portion on said latch member cooperating with said trigger to engage said latch means as said latch member moves into bail retaining position.

As it is a requirement that the trap mechanisms as described above are required to humanely kill the pests or predators, the jaw or jaw mechanisms need to be highly powered (for example, by the use of spring(s), to cause rapid movement of the jaw(s) such that sufficient killing force is applied so that the target pest or predator will die immediately or within a shortened time period.

There are safety issues associated with these types of traps which relies on direct interaction with the killing components of the traps and therefore are capable of causing serious injury to a person or operator. An operator needs to be extremely careful when clearing, maintaining or re-setting the traps.

Furthermore, because of the spring loading of the jaw(s) of the trap mechanisms of the above, a large amount of physical strength and technique is required when clearing and setting the trap. In general, when clearing the trap, the operator will need to lift a jaw away from the dead pest or predator at a sufficient distance to allow the pest or predator to be cleared from the trap. Often it will not be practical to lift and hold the jaw while clearing the trap. Therefore, the jaw may need to be restrained in raised position so that the jaw does not inadvertently fall and cause injury to the operator. In order to overcome this problem a PodiTrap™ apparatus has been developed which utilises a lever design which is directly coupled to the trap mechanism when set. However, the leverage of the PodiTrap™ setting lever decreases upon setting, thus requiring a greater force closer to the set point. Furthermore, there are no active safety mechanisms to protect the user when clearing the pest or predator.

Therefore, from the above it would be useful to an improved animal trap which requires less setting force and has active safety mechanism to protect the user or at least to provide the public with a useful choice.

Further aspects and advantages of the animal trap and its usage will become apparent from the ensuing description that is given by way of example only.

SUMMARY

Described herein is an animal trap which utilises an integrated enclosure having an active safety mechanism where the lid is fully open, the trap is safe to clear, maintain and set. When the lid is closed and the capture flag is in the downwards position, the trap is active. When a pest or predator enters the tunnel architecture and activates the trap mechanism, the trap is sprung and the capture flag is raised. The trap is easy to set due to the mechanical advantage of utilising the lid as a lever.

In a first aspect there is provided an animal kill trap integrated within an enclosure comprising:

an upper lid hinged at a front end of the trap, wherein connecting rods extend between the upper lid to the trap mechanism to cause the trap mechanism to be opened and non-triggerable until the lid is closed thereby allowing baiting and inspection of the trap without risk of injury to a user by accidental triggering of the trap, and wherein utilisation of the hinged lid of the trap acts as an lever to reduce the force required to set or empty the trap.

In a second aspect there is provided a method of utilising the animal trap as substantially described above.

In a third aspect there is provided a use of an animal trap for capturing and killing pest and/or predators as substantially described above.

Advantages of the above include an integrated trap with a tunnel architecture for attracting and appealing to animals—the mechanism being contained under the floor allows the architecture of the trap to effectively be a tunnel shape where the animal can enter the trap with little visual obstruction and a direct line of sight through the trap to the bait for the animal; the utilisation of the lid for setting the trap mechanism thus requiring minimal leverage and additionally acts as a safety mechanism and visual indicator advising that when the lid is open, the trap is safe to clear, maintain and re-set. Also, the trap includes a counter-balanced capture flag as a visual indicator to advise when an animal has been captured. The device is compact, light-weight and highly powerful relative to the force required to set the trap.

BRIEF DESCRIPTION OF THE DRAWINGS

Further aspects of the apparatus, methods and uses will become apparent from the following description that is given by way of example only and with reference to the accompanying drawings in which.

DETAILED DESCRIPTION

Figure 1:
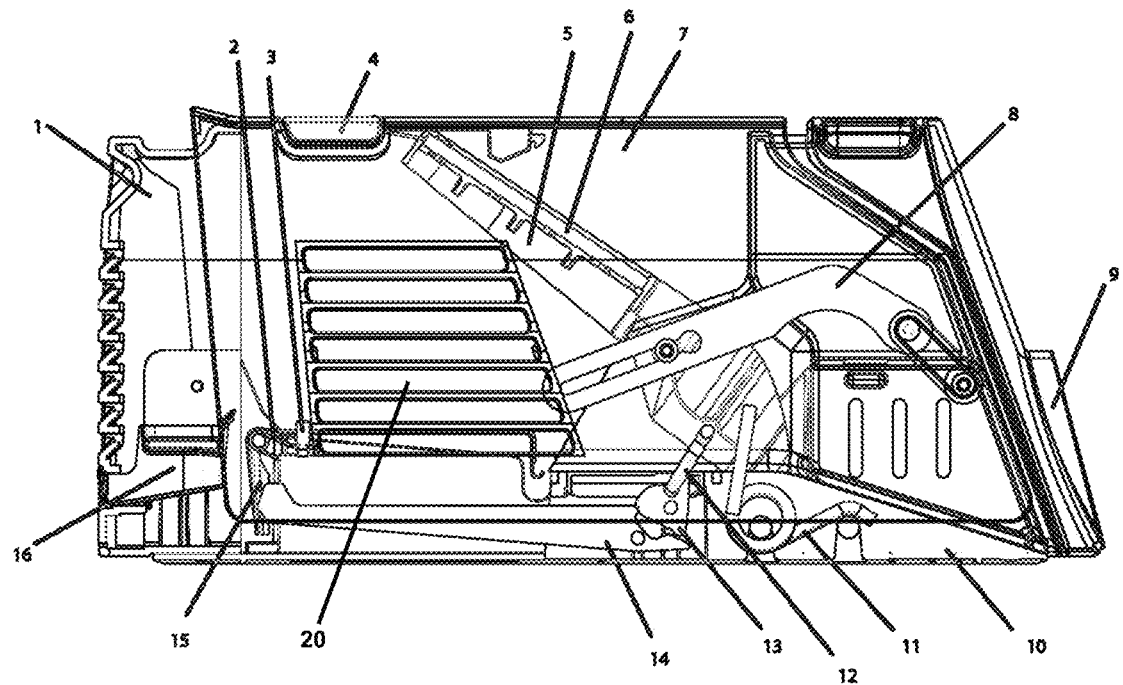
FIG. 1 illustrates a side sectional view of the animal trap with component labels in the set position.

As noted above, described herein is an animal trap which utilises an integrated enclosure having an active safety mechanism where the lid is fully open, the trap is safe to clear, maintain and set. When the lid is closed and the capture flag is in the downwards position, the trap is active. When a pest or predator enters the tunnel architecture and activates the trap mechanism, the trap is sprung and the capture flag is raised. The trap is easy to set due to the mechanical advantage of utilising the lid as a lever.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'treadle' or grammatical variations thereof refers to a lever mechanism activated by weight or pressure for converting reciprocating motion into rotating motion.

In a first aspect there is provided an animal kill trap integrated within an enclosure comprising:

an upper lid hinged at a front end of the trap, wherein connecting rods extend between the upper lid to the trap mechanism to cause the trap mechanism to be opened and non-triggerable until the lid is closed thereby allowing baiting and inspection of the trap without risk of injury to a user by accidental triggering of the trap, and wherein utilisation of the hinged lid of the trap acts as an lever to reduce the force required to set or empty the trap.

In preferred embodiments, the trap may comprise a kill or strike bar that is over-centred by way of reset arms attached to the lid, wherein the lid pivot is over-centred. In this way, minimal leverage is required to re-set the trap.

Preferably, the kill bar may have a weight mechanically affixed to provide impact momentum.

Preferably, the enclosure may comprise an enclosed tunnel arrangement. In this way, the trap has a 'tunnel architecture' which entices and is appealing to the animal for entering the trap.

The trap may comprise a safety mechanism wherein the trap cannot be activated when the lid is open. In this way, the lid acts as a visual safety indicator advising that when the lid is open, the trap is safe to clear, maintain and re-set. In this way, the safety mechanism comprises 'physical feedback' provided by the lid when nearing an over centering position. The force reduces and the lid 'snaps' into the over centering position in a controlled manner, thus providing the user feedback it is safe, or in the safe position. In one embodiment, the force may reduce as the lid is cocked further back from the initial sprung position to the safe position (i.e. as the trap mechanism forces become greater).

More preferably, the lid may comprise an integrated lever system for setting and releasing the trap. As aforementioned, an advantage of this configuration is that the lid acts as a lever, and forms a mechanical advantage in lifting the kill bar, so as to reduce the stress and strain on the user. This is particularly advantageous for the high kill bar load for humane killing of large animals.

The trap may comprise a visible indicator to confirm that the trap has been activated. In this way, when the trap has been sprung and the kill bar is down, a capture flag may be raised in the lid of the apparatus, indicating to a user who is not in close proximity, that the trap has been activated and an animal captured.

The activation of the trap may comprise an upwardly sprung treadle or floor mounted trigger which the animal activates by weight or other physical integration of the animal.

The activation pressure of the treadle may be adjustable for compression of the spring which may hold the weight of the treadle.

Preferably, the treadle may have an adjustment screw acting on a treadle spring to allow for an adjustable set-off weight or "activation" for variable target animals.

Upon activation of the treadle, a spring-loaded bar may swing in from above and behind the targeted animal's head thereby dispensing a fatal blow to the animal. In other embodiments, the treadle may be configured to ensure blood, fluid, and water runoff does not end up inside the trap and may drain to the outside of the trap.

Preferably, the bar may be retained in its set position by way of a wire form and locking member. The locking member may be a tumbler. In other embodiments, all five kill bars may not force down hard on treadle, this ensuring the striking/impact pressure is biased towards the animal's head on those animals that progress further through the trap. This configuration is advantageous for animals that have significant muscle mass below the head and in the neck, which may reduce the humaneness of the trap due to less impact being taken in the head.

In one embodiment, the bar may be retained in its set position by way of a wire form and tumbler, which in turn may rests on a sear engaged with the treadle. In this way, the wire form may apply force to the back of the tumbler in the direction of a slot in a centre rib structure.

More preferably, the tumbler may act as a first stage of a trigger and may translate linear force to a downwards rotational force, directly in line with the centre of a pivot point of the falling sear or second stage trigger mechanism thereby translating minimal stored energy in the bar to the end of the sear, wherein it engages with the treadle thus ensuring consistent triggering force due to lack of frictional effects at the interface between the treadle and sear.

A ramp may be utilised on top of the sear, wherein the tumbler may contact and engage with the sear. In this way, the tumbler 'pushes off' the falling sear and may not result in a 'bound' mechanism.

As aforementioned, the sear may be a lever engaged on a shelf on the treadle having a pivot point directly below the location at which a load is being retained by way of the tumbler.

The trap may be configured such that substantially the mechanical force retention and triggering elements may be contained in the floor of the trap and underneath where the animal enters the trap.

In one embodiment, the strike bar may be mechanically linked to the lid of the trap by way of two sliding and slotted linkage members located on either side of the bar. In this way, the slotted member is configured to allow the bar to travel through its entire range of motion unhindered when the trap is activated and the lid of the trap is closed. However, this should not be seen as limiting as other types of linkage members could conceivably be used with this invention. For example, cables that pass through the centreline of the pivot point.

As aforementioned, the visible indicator may comprise a capture flag. The capture flag also may be erected by way of a counter-balanced force of gravity once the kill bar is no longer present to hold the flag in a downwards position.

In further preferred embodiments, pivot points located between kill bar rivets and lid reset arm pivots, and the lid pivot may be configured such that when the lid is fully opened in an over centred position, locks the arm (kill bar) in the retracted set position so as to render the trap completely safe and unable to be activated when the lid is in the open position. This allows for safe clearing of the dispensed animal from the trap, and without danger to the user. In this way, any interaction with the trigger/treadle in the open lid configuration has no effect on the releasing of the kill bar. Again, this configuration should not be seen as limited as other configurations could conceivably be used with this invention.

Preferably, when the wire form when in the fully open position over-rotates the tumbler rearward, this in turn acts on the sear, causing it to lift sufficiently high that the treadle may then spring upwards and allow the mechanism to reset. Furthermore, when the lid is then motioned forward into the closed position, the tumbler nudges the sear forward in turn causing the sear to engage with the treadle, and thus correspondingly lock the tumbler into position.

Preferably, when the lid may be rotated into a closed position; the wire form, kill bar and tumbler elements may lock into their respective positions and may act upon the sear, thereby causing the sear to fall and engage with the treadle. Furthermore, there optionally may also include a feature on the sear to assist with lifting the treadle.

The triggering point may be raised sufficiently that upon closure of the lid, the trigger mechanism may be reset such that the sear may be in engagement with the treadle in a locked configuration and wherein, the triggering point may be the leading edge of the treadle. In this way, the lid is configured that it acts as a lever, and forms a significant mechanical advantage in lifting the kill bar, so as to reduce the stress and strain on a user to a level that sufficiently advantageous to all users, but particularly advantageous to users of lower strength who otherwise may find re-setting such a powerful trap difficult, if not impossible to use. This is particularly advantageous for the high kill bar load required for humane killing of larger target animals.

In other embodiments, the tunnel component may comprise an entrance to the trap which may be removable for easy disposal of body mass of the animal contained within the tunnel component. Often an animal may only proceed as far as having its head or front feet sufficiently into the trap before activation, leaving its entire body mass contained within the tunnel component. In this way, the removability of this component means that for many interactions, the user does not have to touch the dead, sometimes decaying carcass.

The animal may be attracted into the trap by way of a bait placed in a removable bait well beyond the treadle at the rear of the trap i.e. opposite end to the entrance. In this way, the bait well may be removable for cleaning purposes. Furthermore, the trap may comprise vents in both longitudinal and perpendicular directions for carrying scent through the air to attract animals to the trap.

Furthermore, the chassis of the trap may be removably affixed to a ground surface. In this way, the trap can be pegged to the ground by way of ground pegs. The chassis and kill bar may be moulded out of plastic material.

In further embodiments, the trap may comprise a code identification system for identification of the trap and for use in recording trap captures in a centralised database. Preferably, the code identification system may be a Quick Response (QR) matrix barcode.

In one embodiment, the trap may comprise radio communication technology for communication back to a centrally monitored database and to advise when an animal has been trapped. The radio communication protocol may be selected from any one of the following: GPRS, 4/5G, LORA, Celium and/or Satellite.

In a second aspect there is provided a method of utilising the animal trap as substantially described above.

In a third aspect there is provided a use of an animal trap for capturing and killing pest and/or predators as substantially described above.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described animal trap apparatus, methods and uses thereof are now described by reference to a specific example.

Example 1

With reference to FIG. 1, an animal trap is shown in the set or armed configuration with the following componentry: rear cover 1, treadle spring 2, treadle set-off weight adjuster 3, capture flag 4, kill bar 5, kill bar weight 6, lid (reset lever) 7, reset arm 8, tunnel component 9, chassis 10, kill bar force spring 11, trigger wire form 12, tumbler 13, falling lever sear 14, treadle 15, vents 20, and bait well 16.

Figure 9:
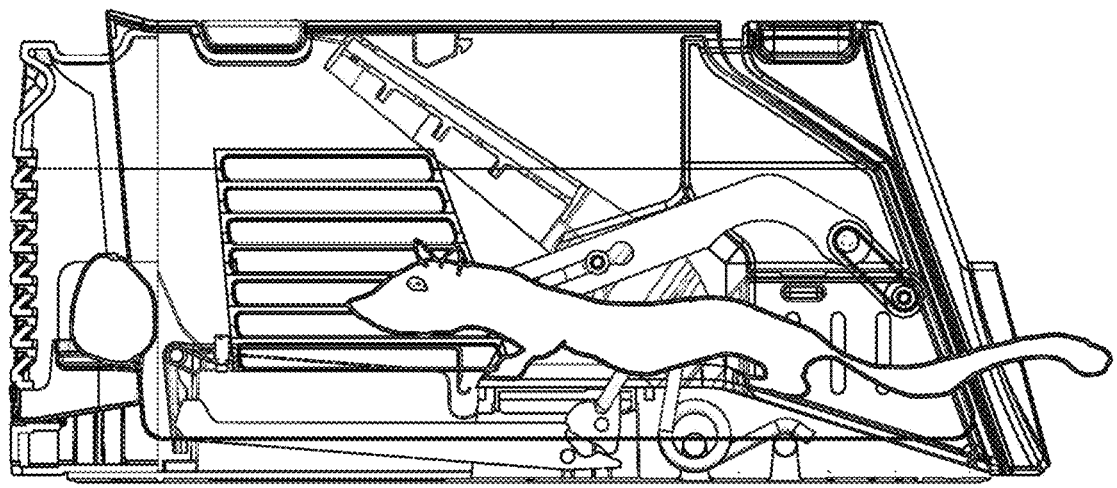
FIG. 9 illustrates a side sectional view of the animal trap with an exemplary egg bait and animal trapped within the trap.

An animal (as best seen in FIG. 9) is attracted into the animal trap by way of a bait (FIG. 9) placed in the bait well beyond the treadle 15 (opposite end to tunnel component 9 and entrance) at the rear of the trap. Also, the chassis 10 of trap can be pegged to the ground by way of ground pegs (not shown).

Figure 2:
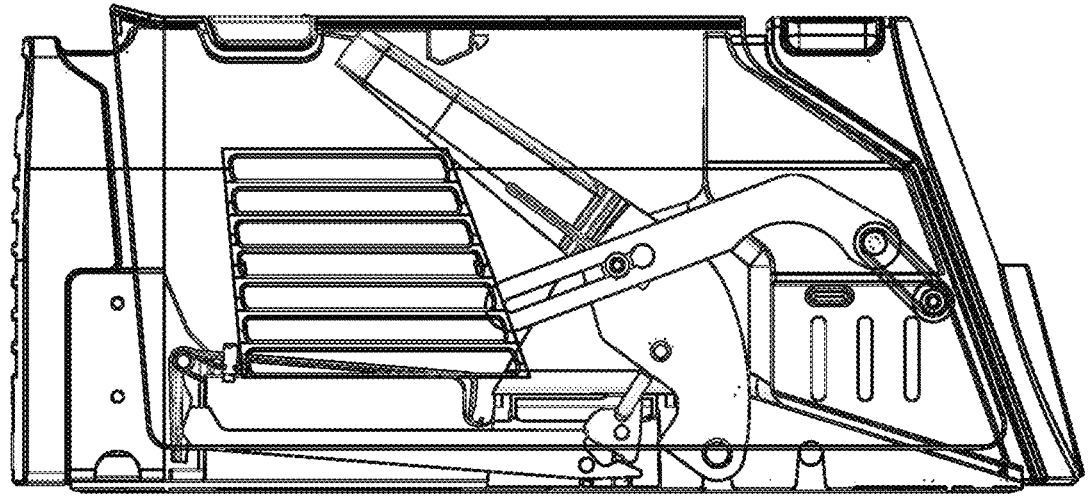
FIG. 2 illustrates a side sectional view of the animal trap with the treadle in the depressed position.

The animal trap relies on activation by way of an upwardly-sprung treadle 15 or floor-mounted trigger which the animal (FIG. 9) activates by weight or other physical interaction (for example, its head). The activation pressure applied to the treadle 15 is adjustable by way of the treadle set-off weight adjuster 3 and compressing the treadle spring 3 holds the weight of the treadle 15. The treadle 15 in a depressed position is best seen in FIG. 2.

Figure 4:
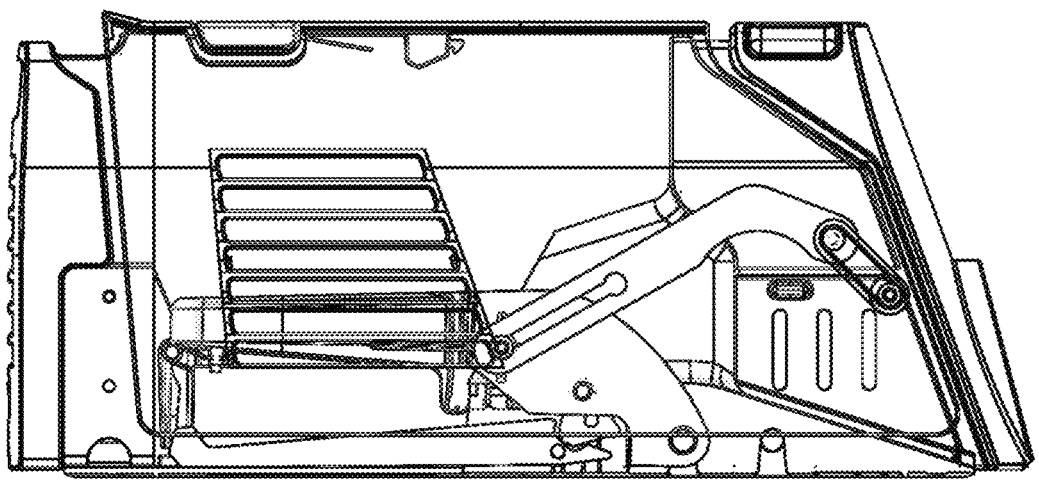
FIG. 4 illustrates a side sectional view of the animal trap with the kill bar in the sprung down position.

Upon activation, the spring-loaded kill bar 5 with weight 6 swings in from above/behind the targeted animal's head, dispensing a fatal blow to the animal, best seen in FIG. 4. The kill bar 5 is retained in its set position (FIG. 1) by way of a wire form 12 and tumbler 13, which in turn rests on a sear 14, which is engaged with the treadle 15. The wire form 12 applies force to the back of the tumbler 13, in the direction of the slot in the centre rib structure.

Figure 3:
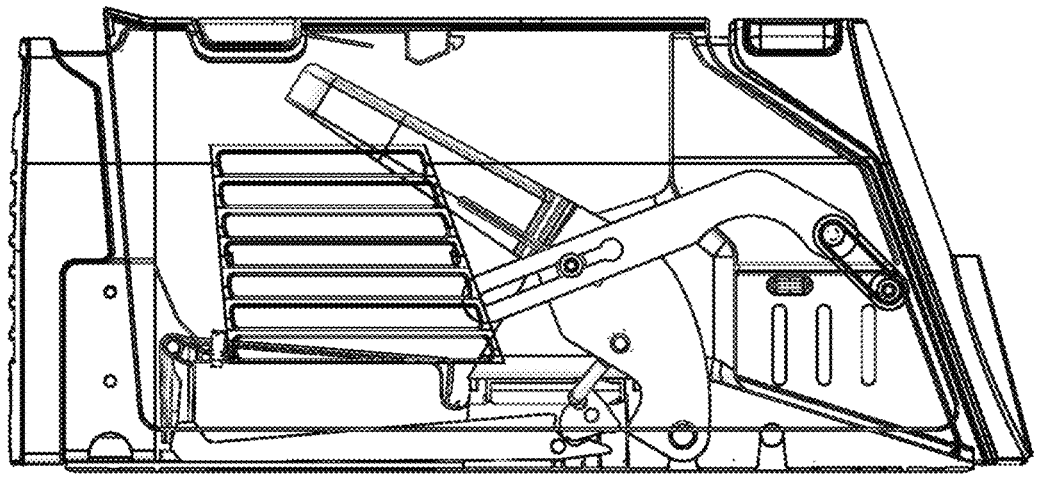
FIG. 3 illustrates a side sectional view of the animal trap with the fallen lever sear in the fallen position and with the tumbler released.

The tumbler 13 is the first stage of the trigger, and translates linear force to rotational force downwards, directly in line with the centre of the pivot point of the falling sear (FIG. 3), thereby translating minimal stored energy in the kill arm 5 to the end of the sear 14 where it engages with the treadle 15 (thereby ensuring consistent triggering force due to lack of frictional effects).

A small ramp is used on the top of the sear 14 where the tumbler 13 contacts to ensure the tumbler 13 releases (FIG. 3) the falling sear 14 and does not result in a jammed mechanism. The weight 6 is mechanically fixed to the kill bar 5 to provide impact momentum. The sear 14 is a lever which is engaged on a shelf on the treadle 15, with a pivot point directly below the location at which the load is being retained (by way of the tumbler).

The animal trap is configured such that all mechanical force retention and triggering elements are neatly contained in the floor of the apparatus, underneath where the animal walks. This allows the architecture of the trap above to effectively be a 'tunnel' shape where the animal enters the trap, with little visual obstruction and a direct line of sight through the trap to the bait for the animal.

The kill bar 5 is mechanically linked to the lid 7 of the apparatus by way of two sliding/slotted linkage members 18 on either side of the kill bar 5. The slotted members 18 allow the kill bar 5 to travel through its entire range of motion unhindered when the trap is triggered/sprung and the lid 7 of the trap is closed.

Figure 5:
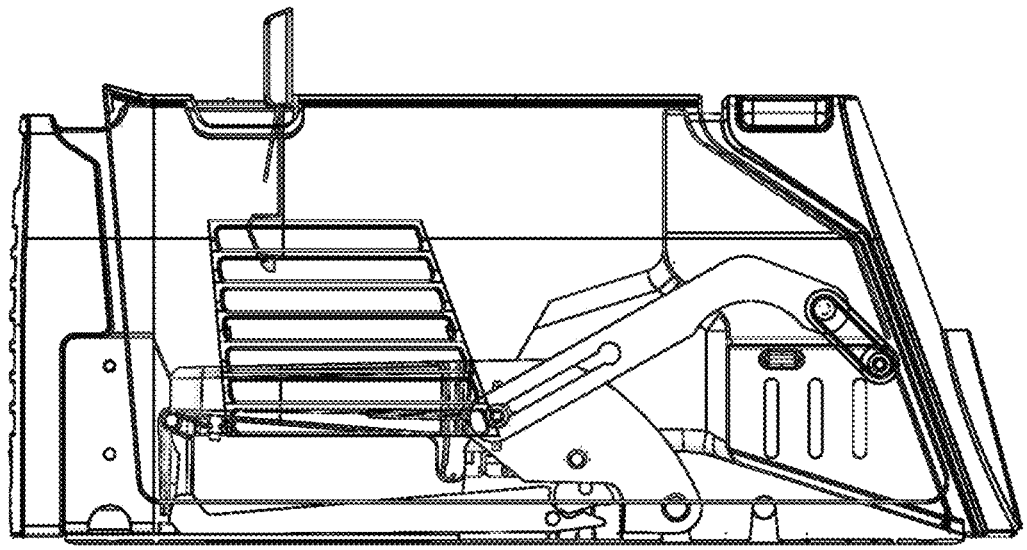
FIG. 5 illustrates a side sectional view of the animal trap showing the capture flag in the vertical position.

A capture flag is also erected by way of counter-balanced force of gravity once the trap has been sprung (FIG. 4) and the kill bar is no longer present (down position) to hold the flag in a down position and is best seen in FIG. 5. The capture flag indicating to a user who is not in close proximity, that the trap has been sprung and an animal is captured.

Figure 6:
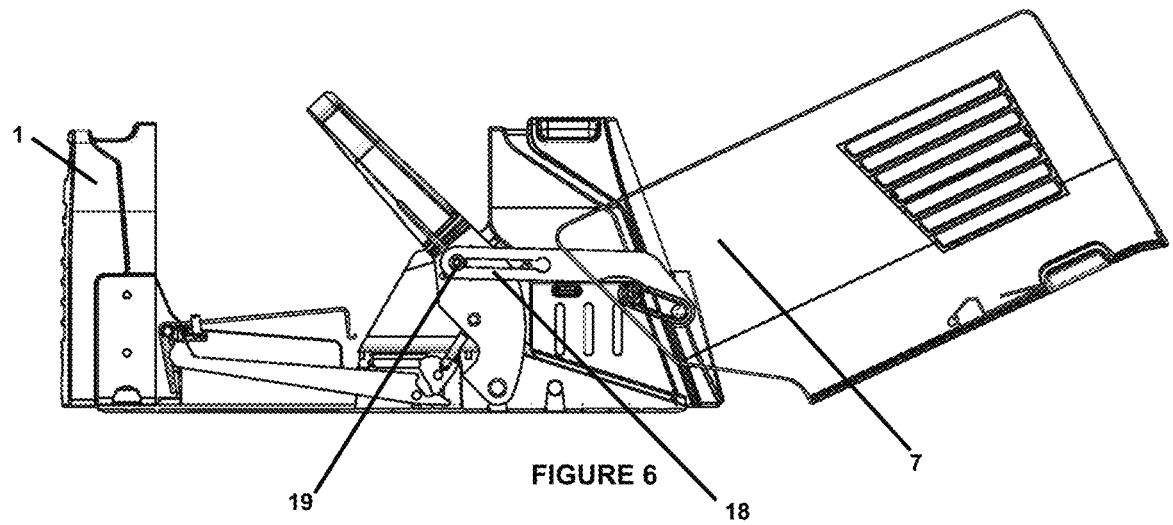
FIG. 6 illustrates a side sectional view of the animal trap with the lid in the fully opened position, kill bar retracted, falling lever sear lifted and the treadle sprung upwards.

Referring to FIG. 6, when the lid 7 of the trap is opened, the bottom of the sliding and slotted linkage members 18 (by way of rivets 19 on either side of the kill bar) retract the kill bar 5 back up to its set position. As shown at least in FIG. 6, the upper lid is hinged at a front end (opposing said rear cover 1) of the animal kill trap. The pivot points between the kill bar 5 rivets and lid reset arm pivots, and the lid pivot, are configured that when the lid 7 is in the fully opened position, the lid 'over centres', thus locking the kill arm in the set position so as to render the apparatus completely safe and unable to be activated when open. This allows for safe clearing of the deceased animal from the trap, and rebaiting without danger to the user. In this configuration, any interaction with the trigger/treadle in the lid-open position has no effect on the releasing of the kill bar.

Figure 7:
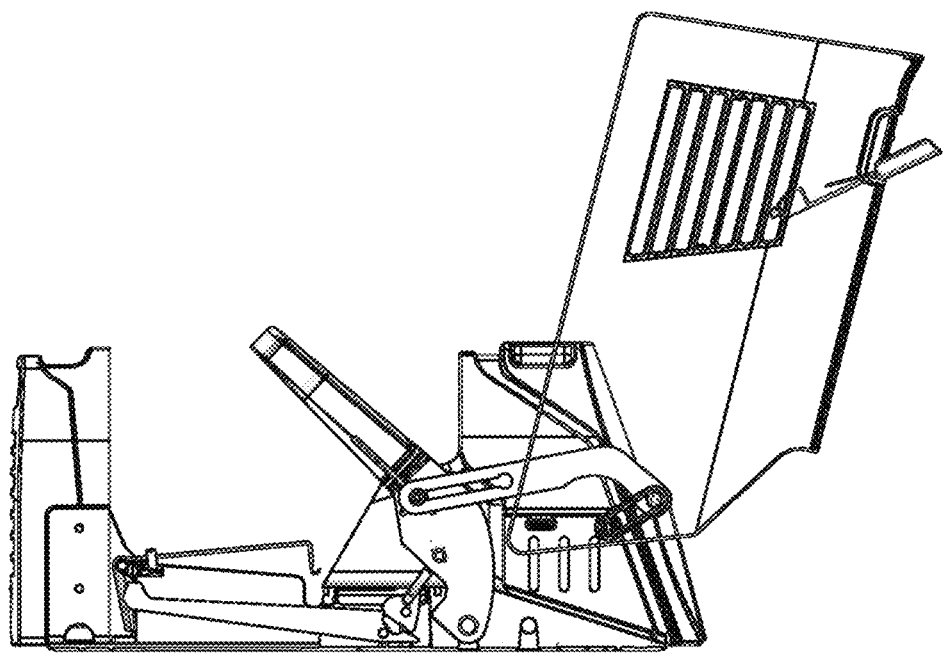
FIG. 7 illustrates a side sectional view of the animal trap with the lid in the partially opened position, where the sear can engage with the treadle in a locked fashion once more such that the trap mechanism begins its cycle of resetting again.
Figure 8:
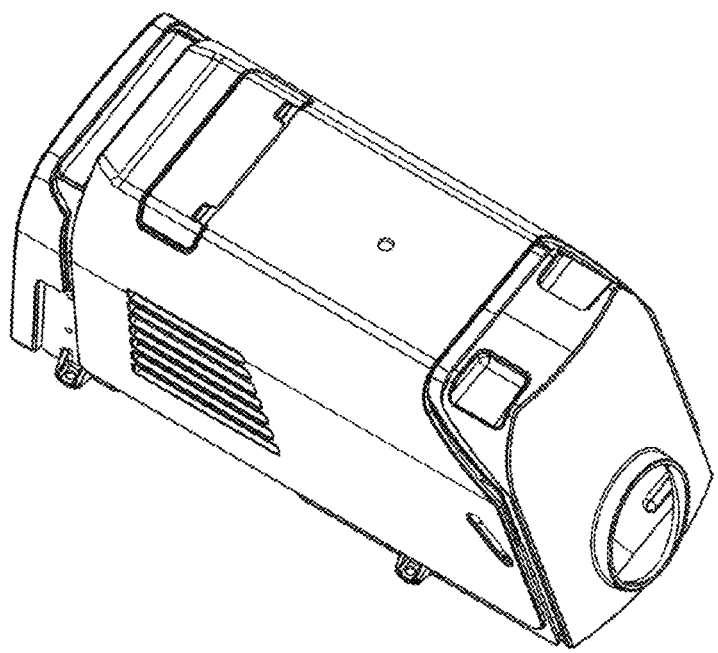
FIG. 8 illustrates a top front perspective view of the animal trap.

Furthermore, when the lid 7 is opened and the kill bar 5 is sufficiently retracted, the wire form 12 linked to the kill arm 5 is also retracted and acts upon the tumbler 13, which in turn acts upon the falling sear 14, causing the sear 14 to be lifted sufficiently to allow the treadle 15 to spring upwards sufficiently thereby 'resetting' the mechanism. Conversely, when the lid is proceeded to be rotated into the closed position (FIGS. 1 and 8) all components lock into their respective positions. That is, it lifts the triggering point sufficiently high enough that upon closing of the lid, the trap mechanism begins its cycle of resetting again (i.e. the sear can engage with the treadle in a locked fashion once more as seen in FIG. 7).

The lid is configured in such a way that it acts as a lever, and forms a significant mechanical advantage in lifting the kill bar, so as to reduce stress and strain on the user.

Also, the tunnel component comprising the entrance to the trap is removable for the purposes of clearing the deceased animal from the trap. It has been observed that often the animal will only get so far as having its head or front feet sufficiently into the trap before activation, leaving its entire body mass contained within the tunnel component. The removability of this part means that for many interactions the user does not have to touch the dead, and sometimes decaying carcass.

It is envisaged that the trap will also employ QR Code identification on the outside of the trap, for use in recording trap captures on a centralised digital database. The trap will also employ radio communication technology (GPRS, 4/5G, LORA, Callum etc) to communicate back to a centrally monitored database and advise when an animal has been captured.

It is further envisaged that the radio communication components are (not shown), will be located above and/or behind the kill bar and affixed inside the lid.

Aspects of the present invention have been described by way of sample only and it should be appreciated that modifications and additions may be made thereto without departing from the scope of the claims herein.

What is claimed is:

1. An animal kill trap comprising: an enclosure that comprises:
    an upper lid that is hinged at a front end of the animal kill trap,
    a trap mechanism configured to be opened and non-triggerable until the upper lid is in a closed position thereby allowing baiting and inspection of the animal kill trap without risk of injury to a user by accidental triggering of the animal kill trap,
    wherein utilization of the upper lid of the animal kill trap acts as a lever to reduce a force required to set or empty the animal kill trap; and,
    wherein the trap mechanism comprises:
        a kill bar, and
        two lid reset arms and two sliding and slotted linkage members, such that each lid reset arm of said two lid reset arms comprises one of said two sliding and slotted linkage members located on either side of the kill bar and attached to the upper lid,
    wherein the kill bar is mechanically linked to the upper lid by way of said two sliding and slotted linkage members located on either side of the kill bar.

2. The animal kill trap as claimed 1, wherein the upper lid is over-centered to ensure that the kill bar is locked in a deactivated position when the upper lid is in an open position.

3. The animal kill trap as claimed in claim 2, wherein the kill bar comprises a weight mechanically affixed to provide impact momentum.

4. The animal kill trap as claimed in claim 1, wherein the enclosure further comprises an enclosed tunnel arrangement.

5. The animal kill trap as claimed in claim 1, wherein the animal kill trap further comprises a safety mechanism wherein the animal kill trap cannot be activated when the upper lid is open in an over centering position to a safe position.

6. The animal kill trap as claimed in claim 5, wherein a force reduces as the upper lid is cocked further back from an initial sprung position to the safe position.

7. The animal kill trap as claimed in claimed 1, wherein the upper lid comprises an integrated lever system comprising said lever that sets and releases the animal kill trap in order for said upper lid to reduce said force required to set or empty the animal kill trap.

8. The animal kill trap as claimed in claim 1, wherein the animal kill trap further comprises a visible indicator to confirm that the animal kill trap has been activated.

9. The animal kill trap as claimed in claim 8, wherein the visible indicator is a capture flag that is erected by way of a counter-balanced force of gravity once a bar is no longer present to hold the capture flag in a downwards position.

10. The animal kill trap as claimed in claimed 1, wherein said trap mechanism further comprises an upwardly sprung treadle to activate the animal kill trap which is configured to be activated by an animal by weight.

11. The animal kill trap as claimed in claim 10, wherein activation pressure of the upwardly sprung treadle is adjustable to compress a spring which holds a weight of the upwardly sprung treadle.

12. The animal kill trap as claimed in claim 11, wherein the upwardly sprung treadle is adjustable via an adjustable set-off weight adjuster for variable target animals.

13. The animal kill trap as claimed in claim 10, wherein the kill bar is a spring-loaded bar, wherein upon activation of the upwardly sprung treadle, the spring-loaded bar is configured to swing in from above and behind a targeted animal's head thereby dispensing a fatal blow to the targeted animal.

14. The animal kill trap as claimed in claim 13, wherein the spring-loaded bar is retained in a set position by way of a wire form and locking member.

15. The animal kill trap as claimed in claim 14, wherein the locking member is a tumbler.

16. The animal kill trap as claimed in claim 15, wherein said trap mechanism further comprises a sear, wherein the spring-loaded bar is retained in the set position by way of the wire form and the tumbler, which in turn rests on a searthe sear engaged with the upwardly sprung treadle, such that the wire form applies force to a back of the tumbler in a direction of a slot in a center rib structure.

17. The animal kill trap as claimed in claim 16, wherein the tumbler acts as a first stage of a trigger and translates linear force to a downwards rotational force, directly in line with a center of a pivot point of the sear that is falling or a second stage trigger mechanism thereby translating minimal stored energy in the spring-loaded bar to an end of the sear, wherein it engages with the upwardly sprung treadle thus ensuring consistent triggering force due to lack of frictional effects at an interface between the upwardly sprung treadle and the sear.

18. The animal kill trap as claimed in claim 16, wherein a ramp is utilized on top of the sear, wherein the tumbler contacts and engages with the sear.

19. The animal kill trap as claimed in claim 16, wherein the sear is a lever engaged on a shelf on the upwardly sprung treadle having a pivot point directly below a location at which a load is being retained by way of the tumbler.

20. The animal kill trap as claimed in claim 16, wherein the wire form, when in a fully open position, over-rotates the tumbler rearward, this in turn acts on the sear, causing the sear to lift sufficiently high that the upwardly sprung treadle then springs upwards and allows the trap mechanism to reset.

21. The animal kill trap as claimed in claim 16, wherein when the upper lid is motioned forward into the closed position, the tumbler acts against the sear to move it forward in turn causing the sear to engage with the upwardly sprung treadle, and thus correspondingly locks the tumbler into position.

22. The animal kill trap as claimed in claim 16, wherein when the upper lid is rotated into the closed position, the wire form, kill bar and tumbler lock into their respective positions and act upon the sear, thereby causing the sear to fall and engage with the upwardly sprung treadle.

23. The animal kill trap as claimed in claim 16, wherein a triggering point is raised substantially that upon closure of the upper lid, a trigger mechanism resets such that the sear is in engagement with the upwardly sprung treadle in a locked configuration and wherein, the triggering point is a leading edge of the upwardly sprung treadle.

24. The animal kill trap as claimed in claim 1, wherein the trap mechanism is configured such that substantially mechanical force retention and triggering elements are contained on a floor of the animal kill trap and underneath where an animal enters the animal kill trap.

25. The animal kill trap as claimed in claim 1, wherein the trap mechanism further comprises kill bar rivets on the kill bar which are coupled to said two sliding and slotted linkage members, and wherein the two lid reset arms are configured such that when the upper lid is fully opened in an over centered position from said upper lid hinged at said front end of the animal kill trap, the two lid reset arms lock the kill bar in a retracted set position so as to render the animal kill trap completely safe and unable to be activated when the upper lid is in an open position from said upper lid hinged at said front end of the animal kill trap such that said utilization of the upper lid of the animal kill trap acts as said lever to reduce said force required to set or empty the animal kill trap.

26. The animal kill trap as claimed in claim 1, further comprising a tunnel component that comprises an entrance to the animal kill trap which is removable and configured for easy disposal of body mass of an animal contained within the tunnel component.

27. The animal kill trap as claimed in claim 1, wherein the trap mechanism further comprises an upwardly sprung treadle, and wherein the animal kill trap is configured to attract an animal into the animal kill trap by way of a bait placed in a removable bait well beyond the upwardly sprung treadle at the reara rear end of the animal kill trap.

28. The animal kill trap as claimed in claim 1, wherein the enclosure further comprises vents in horizonal directions that are configured to carry scent through air to attract animals to the animal kill trap.

29. The animal kill trap as claimed in claim 1, wherein the trap mechanism further comprises an upwardly sprung treadle, and wherein the kill bar does not force down hard on the upwardly sprung treadle, thus configured to ensure that striking or impact pressure is biased towards an animal's head on animals that progress further through the animal kill trap.

30. The animal kill trap as claimed in claim 1, wherein said enclosure further comprises a chassis, and the chassis is configured to be removably affixed to a ground surface.

31. The animal kill trap as claimed in claim 1, wherein the animal kill trap further comprises a code identification system that identifies the animal kill trap and that is used in recording trap captures in a centralized database.

32. The animal kill trap as claimed in claim 31, wherein the code identification system is a Quick Response matrix barcode.

33. The animal kill trap as claimed in claim 1, wherein the animal kill trap further comprises radio communication technology that communicates back to a centrally monitored database and that is configured to advise when an animal has been trapped.

34. The animal kill trap as claimed in claim 33, wherein the radio communication technology comprises one or more of GPRS, 4/5G, LORA, Celium, and Satellite.

* * * * *